United States Patent
Kang et al.

(10) Patent No.: US 9,312,909 B2
(45) Date of Patent: *Apr. 12, 2016

(54) RF SWITCH

(71) Applicant: SAMSUNG ELECTRO-MECHANICS CO., LTD., Suwon-Si, Gyeonggi-Do (KR)

(72) Inventors: Suk Chan Kang, Suwon-Si (KR); Kyu Jin Choi, Suwon-Si (KR); Jae Hyouck Choi, Suwon-Si (KR); Jeong Hoon Kim, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/316,505

(22) Filed: Jun. 26, 2014

(65) Prior Publication Data

US 2015/0188597 A1     Jul. 2, 2015

(30) Foreign Application Priority Data

Dec. 27, 2013  (KR) .......................... 10-2013-0165455

(51) Int. Cl.
*H04B 1/44*  (2006.01)
*H04B 17/00*  (2015.01)
*H04B 1/525*  (2015.01)

(52) U.S. Cl.
CPC ..................................... *H04B 1/525* (2013.01)

(58) Field of Classification Search
USPC ........... 455/78, 79, 552.1, 553.1, 63.1, 67.11, 455/67.13
See application file for complete search history.

(56) References Cited

U.S. PATENT DOCUMENTS

| | | | | |
|---|---|---|---|---|
| 6,804,502 B2 * | 10/2004 | Burgener | .................. | H01P 1/15 455/550.1 |
| 8,649,741 B2 * | 2/2014 | Iijima | ................ | H03K 17/6221 455/83 |
| 8,963,618 B2 * | 2/2015 | Keane | ................ | H03K 17/6872 327/434 |
| 2003/0090313 A1 | 5/2003 | Burgener et al. | | |
| 2015/0214931 A1 * | 7/2015 | Yoo | ........................ | H03K 3/013 455/78 |

FOREIGN PATENT DOCUMENTS

KR   10-2012-0070485 A   6/2012

* cited by examiner

*Primary Examiner* — Quochien B Vuong
(74) *Attorney, Agent, or Firm* — NSIP Law

(57) ABSTRACT

A RF (Radio Frequency) switch may include: a common port; a first switching unit including a plurality of first switching devices; a second switching; a negative voltage generating unit sensing the high frequency signal from the common port and rectifying the sensed high frequency signal to generate a negative voltage; and a logic circuit unit controlling switching operations of the first and second switching units using the negative voltage provided from the negative voltage generating unit and a positive voltage provided from the outside.

12 Claims, 4 Drawing Sheets

RF SWITCH

CROSS-REFERENCE TO RELATED APPLICATION

This application claims the benefit of Korean Patent Application No. 10-2013-0165455 filed on Dec. 27, 2013, with the Korean Intellectual Property Office, the disclosure of which is incorporated herein by reference.

BACKGROUND

The present disclosure relates to a RF (Radio Frequency) switch.

In accordance with the development of wireless communications technology, various communications standards have been developed simultaneously. In addition, in accordance with the miniaturization of wireless communications modules and improvements in the performance of portable communications terminals, the need for individual portable communications terminals to conform to a plurality of communications standards has become apparent. Therefore, the amount of frequency bands that an individual portable communications terminal should be operable with has increased.

That is, existing second-generation (2G) and third-generation (3G) communications technologies have been supplemented with new communications technologies, such that portable communications terminals using fourth-generation (4G) communications schemes such as Long Term Evolution (LTE) have been developed. In addition, in the area of Wi-Fi communications, portable communications terminals have been implemented with the ability to operate with the IEEE 802.11ac standard in addition to the existing IEEE 802.11b/g/n to enhance marketability thereof.

In accordance with this trend, there has also been demand for support for various frequency bands within a radio frequency (RF) front end field. For example, support for various frequency bands with respect to a RF switch positioned on a signal path between an antenna and an RF chipset has been demand. Therefore, a Single Pole Double Throw (SPDT) type switch has been used in various applications.

RF switches should be able to significantly decrease insertion loss in order to decrease loss of a signal and have excellent isolation properties, in order to significantly decrease interference between various frequency bands.

In addition, recently, a process technology based on a field effect transistor (FET) such as a complementary metal oxide semiconductor (CMOS) switch, or the like, has been developed. However, in order to maintain high linearity or endure high power, a negative voltage smaller than 0 has been required as a voltage between a source-drain and a gate.

The following Related art Document (Patent Document 1), which relates to a switch circuit and a method of switching a RF signal, discloses that a sine wave is generated using a separate oscillator, or the like, and a negative voltage is generated using a charge pump, or the like. However, in Patent Document 1, the separate oscillator and charge pump are required, and a delay may occur in generating the negative voltage using the oscillator and the charge pump.

RELATED ART DOCUMENT (Patent Document 1) US Patent Application Publication No. 2003-0090313

SUMMARY

An aspect of the present disclosure may provide a RF switch capable of generating a negative voltage using a RF output signal without using a separate oscillator or charge pump and controlling a plurality of switching devices through the negative voltage.

According to an aspect of the present disclosure, a RF switch may include: a common port transmitting and receiving high frequency signals; a first switching unit including a plurality of first switching devices connected to each other in series and conducting or blocking a signal transfer path between a first port to and from which the high frequency signal is input and output and the common port; a second switching unit including a plurality of second switching devices connected to each other in series and conducting or blocking a signal transfer path between a second port to and from which the high frequency signal is input and output and the common port; a negative voltage generating unit sensing the high frequency signal from the common port and rectifying the sensed high frequency signal to generate a negative voltage; and a logic circuit unit controlling switching operations of the first and second switching units using the negative voltage provided from the negative voltage generating unit and a positive voltage provided from the outside.

The negative voltage generating unit may include: a sensing circuit unit sensing the high frequency signal from the common port; an amplifying circuit unit amplifying a level of the sensed high frequency signal to a present level; and a rectifying circuit unit rectifying the amplified high frequency signal.

The negative voltage generating unit may further include a filter circuit unit removing ripples from the rectified high frequency signal.

The RF switch may further include: a first shunting unit connected between the second port and the second switching unit to conduct or block a signal transfer path between the second port and a ground; and a second shunting unit connected between the first port and the first switching unit to conduct or block a signal transfer path between the first port and a ground, wherein the first shunting unit includes a plurality of first switching devices connected to each other in series, and the second shunting unit includes a plurality of second switching devices connected to each other in series.

The logic circuit unit may apply a first gate signal to control terminals of the first switching devices included in each of the first switching unit and the first shunting unit to control a switching operation, and may apply a second gate signal to control terminals of the second switching devices included in each of the second switching unit and the second shunting unit to control a switching operation.

Each of the plurality of first and second switching devices may be a field effect transistor (FET) or a bipolar junction transistor (BJT).

According to another aspect of the present disclosure, a RF switch may include: a common port connected to an antenna; a first switching unit including a plurality of first switching devices connected to each other in series between the common port and a first port; a second switching unit including a plurality of second switching devices connected to each other in series between the common port and a second port; a logic circuit unit applying a first gate signal to control terminals of the plurality of first switching devices included in the first switching unit and applying a second gate signal to control terminals of the plurality of second switching devices included in the second switching unit to control the second switching unit to be blocked in the case in which the first switching unit is conducted and to control the second switching unit to be conducted in the case in which the first switching unit is blocked; and a negative voltage generating unit including at least one resistor connected in series with the common port and a rectifying circuit unit connected in series with the at least one resistor and the logic circuit unit between the at least one resistor and the logic circuit unit, wherein the negative voltage generating unit senses an output signal of the common port using the at least one resistor and provides a negative voltage generated by rectifying the sensed output signal by the rectifying circuit unit to the logic circuit unit, and the logic circuit unit generates the first and second gate signals using the negative voltage and a positive voltage provided from the outside.

The negative voltage generating unit may further include at least one amplifier connected between the at least one resistor and the rectifying circuit unit, the amplifier amplifying a level of the sensed output signal to a present level and providing the signal having the amplified level to the rectifying circuit unit.

The negative voltage generating unit may further include at least one capacitor connected in series with a ground between the rectifying circuit unit and the logic circuit unit, the at least one capacitor removing ripples from the rectified output signal and providing the output signal from which the ripple is removed to the logic circuit unit.

The RF switch may further include: a first shunting unit including a plurality of first switching devices connected to each other in series and conducting or blocking a signal transfer path between the second port and a ground; and a second shunting unit including a plurality of second switching devices connected to each other in series and conducting or blocking a signal transfer path between the first port and a ground.

The logic circuit unit may apply the first gate signal to control terminals of the plurality of first switching devices included in the first shunting unit and may apply the second gate signal to control terminals of the plurality of second switching devices included in the second shunting unit.

Each of the plurality of first and second switching devices may be an FET or a BJT.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
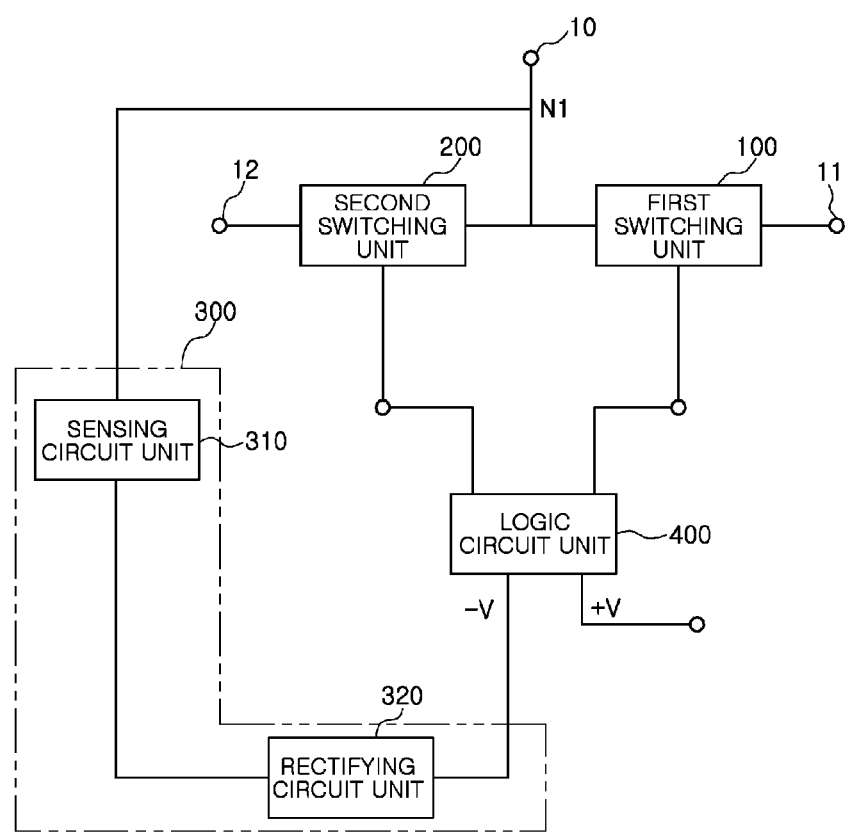
FIG. 1 is a block diagram showing a RF switch according to an exemplary embodiment of the present disclosure.

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. Throughout the drawings, the same or like reference numerals will be used to designate the same or like elements.

FIG. 1 is a block diagram showing a RF switch according to an exemplary embodiment of the present disclosure.

Referring to FIG. 1, a RF switch according to an exemplary embodiment of the present disclosure may include a common port 10 transmitting and receiving high frequency signals, first and second ports 11 and 12 to and from which the high frequency signal is input and output, a first switching unit 100, a second switching unit 200, a negative voltage generating unit 300, and a logic circuit unit 400.

The first switching unit 100 may include a plurality of first switching devices connected to each other in series. In addition, the first switching unit 100 may conduct or block between the common port 10 transmitting and receiving a first high frequency signal and the first port 11 to and from which the first high frequency signal is input and output.

The second switching unit 200 may include a plurality of second switching devices connected to each other in series. In addition, the second switching unit 200 may conduct or block between the common port 10 transmitting and receiving a second high frequency signal and the second port 12 to and from which the second high frequency signal is input and output.

Meanwhile, each of the plurality of first switching devices included in the first switching unit 100 and the plurality of second switching devices included in the second switching unit 200 may be a field effect transistor (FET) or a bipolar junction transistor (BJT).

The negative voltage generating unit 300 may sense the high frequency signal from the common port and rectify the sensed high frequency signal to generate a negative voltage (−V).

The logic circuit unit 400 may control switching operations of the first and second switching units using the negative voltage (−V) provided from the negative voltage generating unit 300 and a positive voltage (+V) provided from the outside. A detailed description thereof will be provided with reference to FIG. 3.

The negative voltage generating unit 300 will be described in more detail with reference to FIG. 2.

Figure 2:
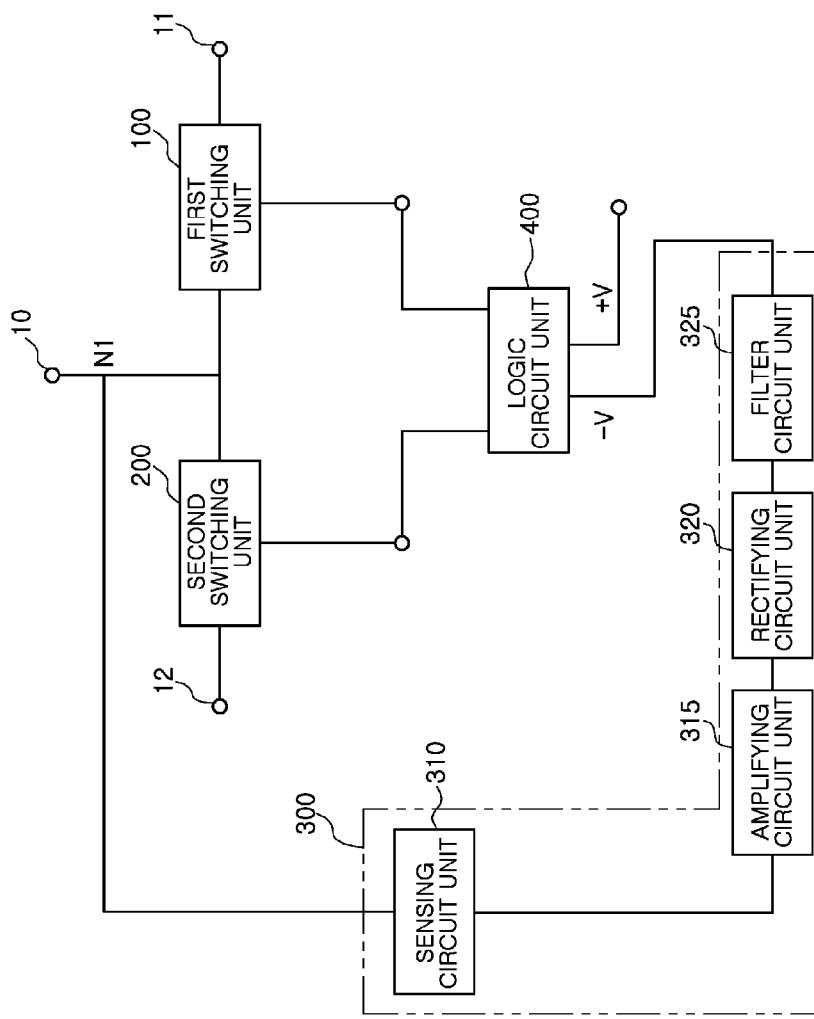
FIG. 2 is a block diagram showing the RF switch of FIG. 1 in more detail.

FIG. 2 is a block diagram showing the RF switch of FIG. 1 in more detail.

Referring to FIG. 2, the negative voltage generating unit 300 may include a sensing circuit unit 310, an amplifying circuit unit 315, a rectifying circuit unit 320, and a filter circuit unit 325.

The sensing circuit unit 310 may be connected to a first node N1 between the common port 10 and the first and second switching units 100 and 200. The sensing circuit unit 310 may sense a high frequency output signal from the common port 10 and may include at least one resistor by way of example, but is not limited thereto.

The amplifying circuit unit 315 may be connected between the sensing circuit unit 310 and the rectifying circuit unit 320. The amplifying circuit unit 315 may amplify a level of the high frequency signal sensed by the sensing circuit unit 310 to a present level. In the case of using the amplifying circuit unit, deterioration such as insertion loss may be little or be not present, and noise applied from a receiving switching unit of the first and second switching units 100 and 200 may be significantly decreased. As an example of the amplifying circuit unit 315, at least one amplifier may be used.

The rectifying circuit unit 320 may rectify the high frequency signal provided from the amplifying circuit unit 315. The rectifying circuit unit 320 may include at least one diode and may be connected between the amplifying circuit unit 315 and a filter circuit unit 325 to be described below. That is, the rectifying circuit unit 320 may receive the high frequency signal from the amplifying circuit unit 315 and rectify the high frequency signal using at least one diode to generate the negative voltage (−V). Then, the rectifying circuit unit 320 may provide the generated negative voltage to the filter circuit unit 325.

The filter circuit unit 325 may include at least one capacitor and may be connected between the rectifying circuit unit 320 and the logic circuit unit 400. The filter circuit unit 325 may be a low pass filter including at least one capacitor and may remove ripples from the generated negative voltage (−V) and provide the negative voltage from which the ripple is removed to the logic circuit unit 400.

The logic circuit unit 400 may generate first and second gate signals using the negative voltage (−V) provided from the negative voltage generating unit 300 and the positive voltage (+V) provided from the outside. The logic circuit unit 400 may provide the first and second gate signals to control terminals of the plurality of first and second switching devices included in the first and second switching units 100 and 200, respectively. A switching operation will be described below with reference to FIG. 3.

Figure 3:
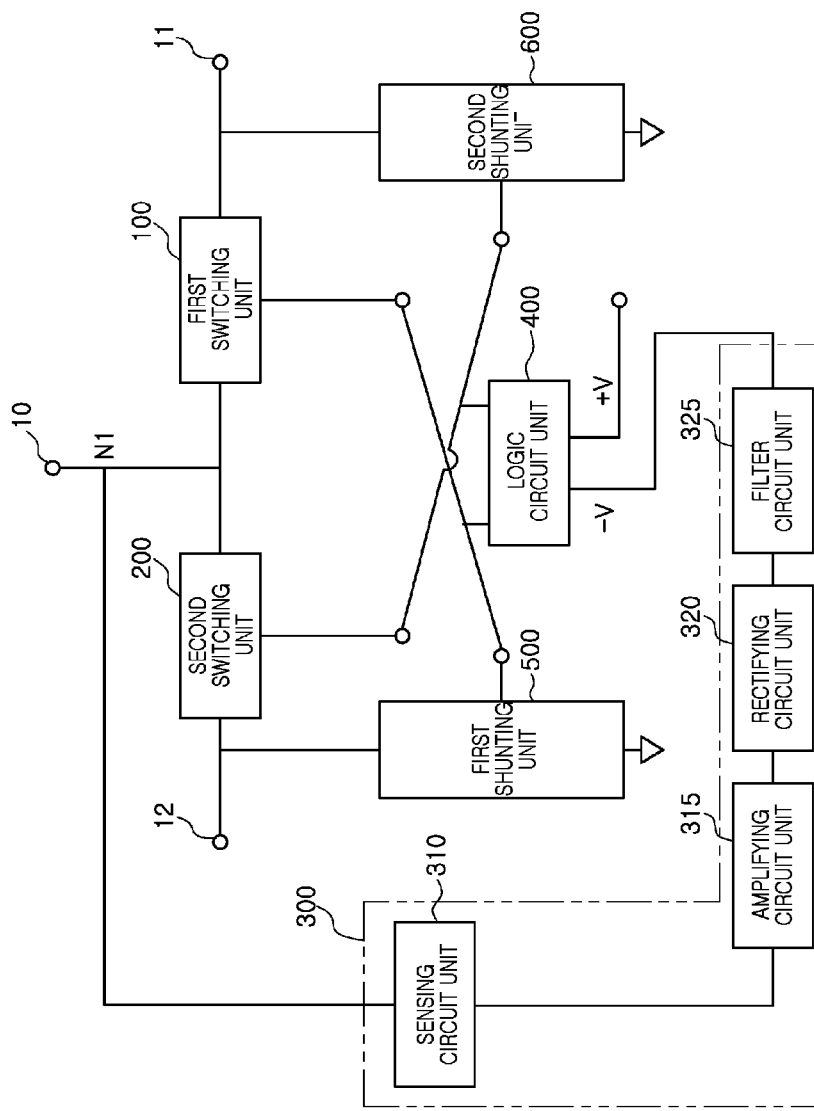
FIG. 3 is a block diagram of the RF switch of FIG. 1 having first and second shunting units added thereto.

FIG. 3 is a block diagram of the RF switch of FIG. 1 having first and second shunting units 500 and 600 added thereto.

Referring to FIGS. 2 and 3, the RF switch according to an exemplary embodiment of the present disclosure may further include a first shunting unit 500 and a second shunting unit 600.

The first shunting unit 500 may include a plurality of first switching devices connected to each other in series. In addition, the first shunting unit 500 may be connected between the second port 12 and the second switching unit 200 to conduct or block a signal transfer path between the second port 12 and a ground.

The second shunting unit 600 may include a plurality of second switching devices connected to each other in series. In addition, the second shunting unit 600 may be connected between the first port 11 and the first switching unit 100 to conduct or block a signal transfer path between the first port 11 and a ground.

Meanwhile, each of the plurality of first switching devices included in the first shunting unit 500 and the plurality of second switching devices included in the second shunting unit 600 may be an FET or a BJT.

Here, the logic circuit unit 400 may generate the first and second gate signals using the negative voltage (−V) provided from the negative voltage generating unit 300 and the positive voltage (+V) provided from the outside, as described above.

The first gate signal may be provided to the first switching unit 100 and the first shunting unit 500. In addition, the second gate signal may be provided to the second switching unit 200 and the second shunting unit 600.

That is, the plurality of switching devices included in each of the first switching unit 100 and the first shunting unit 500 may receive the first gate signal provided to a control terminal thereof, and the plurality of switching devices included in each of the second switching unit 200 and the second shunting unit 600 may receive the second gate signal provided to a control terminal thereof. Therefore, in the case in which the first switching unit 100 and the first shunting unit 500 are simultaneously turned on by the first gate signal, the second switching unit 200 and the second shunting unit 600 may be simultaneously turned off.

To the contrary, in the case in which the first switching unit 100 and the first shunting unit 500 are simultaneously turned off by the first gate signal, the second switching unit 200 and the second shunting unit 600 may be simultaneously turned on by the second gate signal by the second gate signal.

Figure 4:
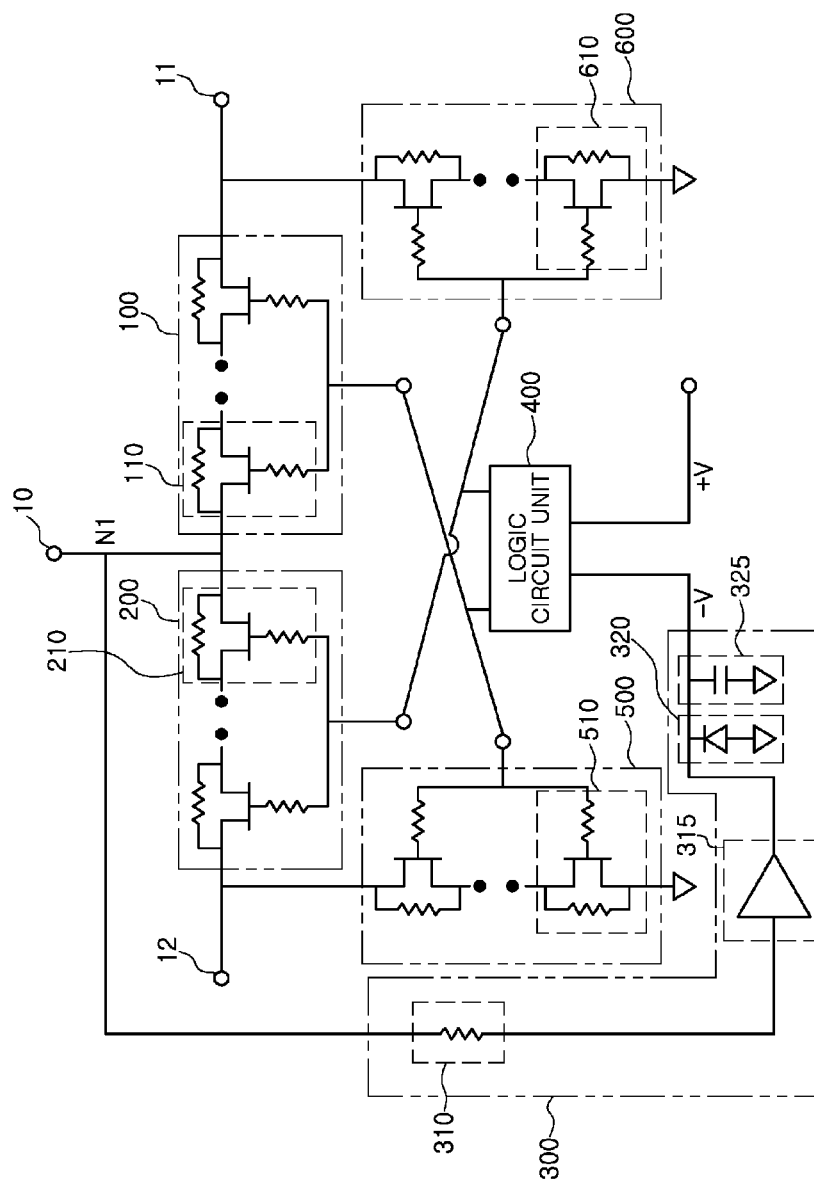
FIG. 4 is a circuit diagram showing the RF switch of FIG. 3 in more detail.

FIG. 4 is a circuit diagram showing the RF switch of FIG. 3 in more detail.

Referring to FIG. 4, the RF switch according to an exemplary embodiment of the present disclosure may include the negative voltage generating unit 300, wherein the negative voltage generating unit 300 may include a resistor as an example of the sensing circuit unit 310, an amplifier as an example of the amplifying circuit unit 315, a diode as an example of the rectifying circuit unit 320, and a capacitor as an example of the filter circuit unit 325.

That is, the RF switch according to an exemplary embodiment of the present disclosure may generate the negative voltage through the high frequency output signal to the common port 10 using the negative voltage generating unit 300 connected to the first node N1, such that a delay is not generated, whereby a switching speed may be improved and the negative voltage may be stably obtained without a separate oscillator or charge pump.

As set forth above, according to exemplary embodiments of the present disclosure, the charge pump or the oscillator does not need to be used in order to generate a separate negative voltage. Therefore, a problem that a delay occurs may be solved. In addition, application of noise at a receiving switch may be significantly decreased, and a separate capacitor for blocking direct current (DC) does not need to be used, such that a switch size may be relatively small.

While exemplary embodiments have been shown and described above, it will be apparent to those skilled in the art that modifications and variations could be made without departing from the spirit and scope of the present disclosure as defined by the appended claims.

What is claimed is:

1. A RF(Radio Frequency) switch comprising:
   a common port transmitting and receiving high frequency signals;
   a first switching unit including a plurality of first switching devices connected to each other in series and conducting or blocking a signal transfer path between a first port to and from which the high frequency signal is input and output and the common port;
   a second switching unit including a plurality of second switching devices connected to each other in series and conducting or blocking a signal transfer path between a second port to and from which the high frequency signal is input and output and the common port;
   a negative voltage generating unit sensing the high frequency signal from the common port and rectifying the sensed high frequency signal to generate a negative voltage; and
   a logic circuit unit controlling switching operations of the first and second switching units using the negative voltage provided from the negative voltage generating unit and a positive voltage provided from outside of the RF switch.

2. The RF switch of claim 1, wherein the negative voltage generating unit includes:
   a sensing circuit unit sensing the high frequency signal from the common port;
   an amplifying circuit unit amplifying a level of the sensed high frequency signal to a present level; and
   a rectifying circuit unit rectifying the amplified high frequency signal.

3. The RF switch of claim 2, wherein the negative voltage generating unit further includes a filter circuit unit removing ripples from the rectified high frequency signal.

4. The RF switch of claim 1, further comprising:
   a first shunting unit connected between the second port and the second switching unit to conduct or block a signal transfer path between the second port and a ground; and a second shunting unit connected between the first port and the first switching unit to conduct or block a signal transfer path between the first port and a ground, wherein the first shunting unit includes a plurality of first switching devices connected to each other in series, and the second shunting unit includes a plurality of second switching devices connected to each other in series.

5. The RF switch of claim 4, wherein the logic circuit unit applying a first gate signal to control terminals of the first switching devices included in each of the first switching unit and the first shunting unit to control a switching operation, and applying a second gate signal to control terminals of the second switching devices included in each of the second switching unit and the second shunting unit to control a switching operation.

6. The RF switch of claim 1, wherein each of the plurality of first and second switching devices is a field effect transistor (FET) or a bipolar junction transistor (BJT).

7. A RF switch comprising:
a common port connected to an antenna;
a first switching unit including a plurality of first switching devices connected to each other in series between the common port and a first port;
a second switching unit including a plurality of second switching devices connected to each other in series between the common port and a second port;
a logic circuit unit applying a first gate signal to control terminals of the plurality of first switching devices included in the first switching unit and applying a second gate signal to control terminals of the plurality of second switching devices included in the second switching unit to control the second switching unit to be blocked in the case in which the first switching unit is conducted and to control the second switching unit to be conducted in the case in which the first switching unit is blocked; and
a negative voltage generating unit including at least one resistor connected in series with the common port and a rectifying circuit unit connected in series with the at least one resistor and the logic circuit unit between the at least one resistor and the logic circuit unit, wherein the negative voltage generating unit senses an output signal of the common port using the at least one resistor and provides a negative voltage generated by rectifying the sensed output signal by the rectifying circuit unit to the logic circuit unit, and the logic circuit unit generates the first and second gate signals using the negative voltage and a positive voltage provided from outside of the RF switch.

8. The RF switch of claim 7, wherein the negative voltage generating unit further includes at least one amplifier connected between the at least one resistor and the rectifying circuit unit, the amplifier amplifying a level of the sensed output signal to a present level and providing the signal having the amplified level to the rectifying circuit unit.

9. The RF switch of claim 7, wherein the negative voltage generating unit further includes at least one capacitor connected in series with a ground between the rectifying circuit unit and the logic circuit unit, the at least one capacitor removing ripples from the rectified output signal and providing the output signal from which the ripple is removed to the logic circuit unit.

10. The RF switch of claim 7, further comprising:
a first shunting unit including a plurality of first switching devices connected to each other in series and conducting or blocking a signal transfer path between the second port and a ground; and
a second shunting unit including a plurality of second switching devices connected to each other in series and conducting or blocking a signal transfer path between the first port and a ground.

11. The RF switch of claim 10, wherein the logic circuit unit applying the first gate signal to control terminals of the plurality of first switching devices included in the first shunting unit and applying the second gate signal to control terminals of the plurality of second switching devices included in the second shunting unit.

12. The RF switch of claim 7, wherein each of the plurality of first and second switching devices is an FET or a BJT.

* * * * *